Oct. 29, 1935.  H. LANDOLT  2,018,858
SUMMATION METER
Filed Nov. 25, 1930
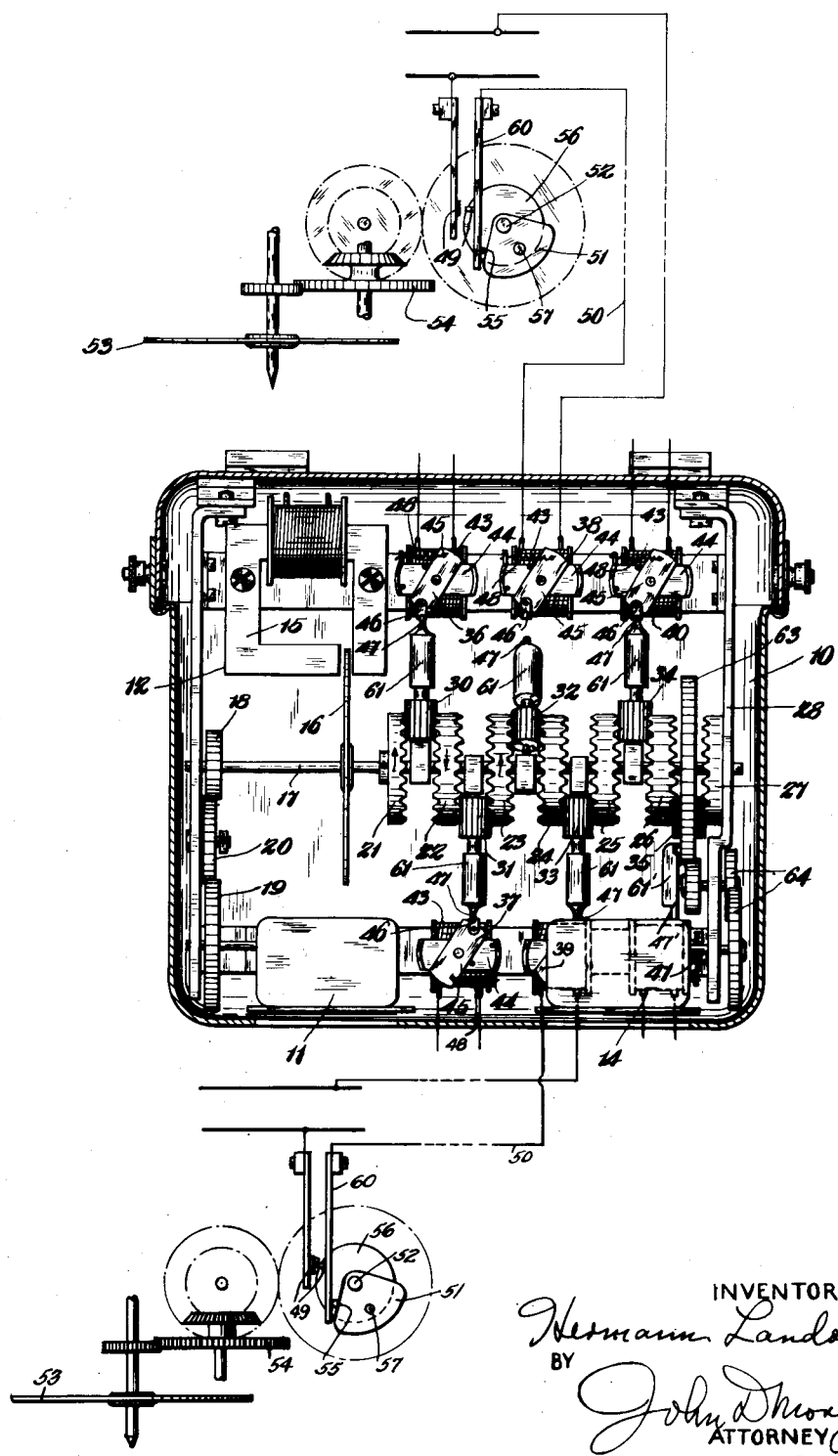
INVENTOR
Hermann Landolt,
BY
John D Morgan
ATTORNEY Patented Oct. 29, 1935

2,018,858

UNITED STATES PATENT OFFICE 2,018,858

SUMMATION METER

Hermann Landolt, Kriens, near Luzern, Switzerland, assignor to Landis & Gyr, A.-G., a corporation of Switzerland Application November 25, 1930, Serial No. 498,099
In Switzerland November 30, 1929

4 Claims. (Cl. 235—92)

The present invention relates to novel and improved summation meters, and more particularly to a summation meter adapted to be located at a distance from the individual meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawing, referred to herein and constituting a part hereof, illustrate one embodiment of the invention, and together with the description, serve to explain the principles of the invention.

The single figure of the drawing is a diagrammatic horizontal section taken through an illustrative embodiment of the present invention, certain parts being shown diagrammatically.

The present invention has for its object the provision of a novel and improved summation meter adapted to totalize the measurement or registration of a plurality of individual meters. A further object is the provision of a summation meter which will accurately register the total consumption of electric energy in a plurality of circuits, or of gas or water in a plurality of lines. Still another object of the invention is the provision of a summation meter which will accurately totalize the registration of a plurality of individual meters located at a distance from the summation meter, regardless of the time of completion of the registration of unit quantities by the individual meters. Another object of the invention is the provision of a summation meter which avoids the defects inherent in the summation meters which depend upon the transmission of exact quantities of current and are always subject to variations in the circuits connecting the individual meters with the summation meters. A further object of the invention is the provision of a summation meter in which correct sequential registration of the measurements of the individual meters will occur even when the impulses are simultaneously transmitted from said individual meters to the summation meters.

In the illustrative embodiment of the present invention, the summation meter comprises a plurality of interconnected differential gears, coaxially mounted on a single shaft, one of said gears being adapted to be directly driven by a continuously energized motor while the other gears are driven from the motor-driven gear through the revoluble differential pinions connecting the gears, while releasable stops are normally interposed in the path of each pinion holding them against revolution and at the same time permitting them to be individually and selectively released in accordance with the consumption of energy, or other measured quantity, in the several circuits. In the embodied form, a register is provided which is driven directly by the motor as the stops are released by the corresponding individual meters, and individual registers may be provided to be driven directly by the revoluble pinions as they are individually released. The stops controlling the pinions are preferably electromagnetically released and their electromagnets are energized by the closing of contacts on the individual meters, once each time a predetermined unit quantity of energy is measured by one of the individual meters.

It will be understood that the foregoing general description and the following detailed description as well, are exemplary and explanatory of the invention, but are not restrictive thereof.

Referring now in detail to the present preferred and illustrative embodiment of the invention as shown in the accompanying drawing, the metering mechanism is mounted in a casing 10 and comprises a summation register 11, actuated in accordance with the sum of the quantities measured in the several circuits, a servomotor 12 for driving the register, a plurality of interconnected differential gearings also driven by the servomotor, and means for controlling the driving of the differential gears and the totalizing register by the consumption of energy in the several circuits as measured by the individual meters, located at a distance, and, if desired, one or more individual registers 14, driven by the servomotor through the differential gearing for registering the energy consumption in any of the individual circuits.

The summation and individual registers 11 and 14 may be of conventional construction and embody the usual counting train permitting the total registration of the individual circuit or of all the circuits to be determined by inspection. If desired, a suitable recording mechanism, such as that shown and described in the patent to Landis & Gyr, A-G., Swiss No. 104,832, may be employed.

The servomotor 12, furnishing the power to drive the summation mechanism and the registers, may also be of conventional construction, but as shown in the drawing, preferably comprises a simple induction motor composed of a driving magnet 15 and the induction disc 16 rotatably mounted by shaft 17. This motor is preferably of relatively small size and furnishes only slightly more power than is required for the operation of the registers so that it may be easily held against rotation while the summation meter is not registering. This motor is directly connected with the register 11 to drive the register by gear 18, fastened on the shaft 17, driving the register gear 19 through idler 20.

For controlling the driving of the summation register 11 by the servomotor 12 in accordance with the total consumption of energy or fluid in the several circuits being measured, a plurality of differential gearings are provided. As embodied, these comprise the differential gears 21, 22, 23, 24, 25, 26 and 27, mounted coaxially on shaft 17, with gear 21 fixed to the shaft, and gear 27 held against rotation by being welded, or otherwise secured, to the end support 28 for shaft 17, while the remaining gears are loosely mounted on the shaft. Between adjacent gears are interposed the differential pinions 30, 31, 32, 33, 34, and 35, revolubly mounted on shaft 17, also rotatable on the radial pinion shafts 47 and meshing with their respective gears, thereby connecting the servomotor 12 to each of the differential gears.

The number of the pinions is preferably the same as the number of individual circuits to be included in the summation, and each of the pinions is provided with a stop permitting the pinion to make a single rotation each time the stop is released. As embodied, six stops 36, 37, 38, 39, 40 and 41 are provided cooperating with pinions 30, 31, 32, 33, 34, and 35 respectively, and each representing different individual circuits. These stops each comprise an electromagnet 43 mounted on the casing 10 and provided with a pole piece 44 and a pivoted armature 45 carrying an abutment 46 which is normally held in the path of the projecting extension of the pinion shafts 47. Springs 48 are provided for moving the armature to its normal position and holding it in that position.

For actuating the controlling device in accordance with the energy consumption in the several circuits, means are provided for momentarily, selectively and individually energizing the electromagnets 43 each time a unit of energy has been consumed in one of the individual metered circuits. As embodied, each of the electromagnets 43 is electrically connected with a corresponding meter-actuated switch which is momentarily closed each time a predetermined unit of energy is measured in the corresponding circuit. While this switch may be of any desired construction, it preferably comprises a pair of normally-open contacts 49 in the electrical circuit 50 leading from the distant individual meter to the electromagnet 43 and is closed by dropping of the rotatable weight 51 which is loosely mounted on shaft 52 driven by the meter disc 53 through suitable gearing 54. Weight 51 is lifted by means of pin 55 on disc 56 which is fast on shaft 52, and as the meter-driven shaft rotates, the weight is first lifted to its highest position, and is pushed over past center which causes it to drop, pressing pin 57 against the spring 50 carrying contact 49, and momentarily closing the circuit.

For insuring proper release of the pinions from the stops as the stops are released, the pinion mountings are preferably unbalanced and tend to assume a definite position under gravitational influence, and as embodied, the extensions 47 carry small weights 61 near their outer ends.

Means are also provided, in accordance with the preferred embodiment, for registering the energy consumption in one or more of the individual circuits at the same time that the total energy consumption in all the circuits is being registered, and this may be carried out with respect to as many circuits as desired. For this purpose, the desired number of individual registers 14 may be provided to be driven by the motor 12 in accordance with the registration of energy by the individual meters 53 located at a distance from the summation meters. These registers 14 are driven directly by the revolution of the corresponding pinions, and as embodied, the pinion 35, corresponding to one of the individual meters and the one to be separately registered, is provided with a ring gear 63 surrounding the pinion 35 and in which the pinion is revolubly mounted, and this ring gear drives a gear train 64 connected with the corresponding individual register 14. At one side of the gear 63 is mounted the extension 47' carrying weight 61'.

The operation of the above-described mechanism may be briefly summarized as follows:—

When no registration is taking place in any of the individual circuits being metered, the motor 12 is energized and tends to rotate disc 16 and shaft 17 to drive the register 11, but this cannot take place because the stops 36, 37, 38, 39, 40 and 41 are positioned in the path of the pinions preventing movement of the pinions. Inasmuch as the pinions are held fast, gear 21 is fixed to the shaft 17, and gear 27 is held against rotation, motor disc 16 cannot rotate and register 11 is not actuated.

Each time a predetermined unit quantity of energy is measured by one of the individual meters 53, located at a distance from the summation meter, the corresponding contacts 49 are closed energizing the corresponding electromagnet 43 and releasing its stop. As soon as this stop is released, the corresponding weight 61 immediately moves the pinion so that the extension is below the abutment 46 and disc 16 begins to rotate gears 21, 22 and 23 and pinions 30 and 31 in the directions shown by the arrows, and this movement continues, all the time revolving pinion 32, until the extension 47 is again brought into contact with the abutment 46, causing the disc to cease rotation. As the disc rotates, gears 18, 19 and 20 are driven a corresponding amount and register 11 is actuated to appropriately increase the total registration.

When the next unit of energy has been measured, this action is repeated with the corresponding stop and pinion and the summation meter is actuated to the same extent by the release of one pinion as by another.

In case two individual meters complete the measurement of the predetermined unit of energy simultaneously and two stops are released at the same time, the released pinion nearest gear 21 first regains its locked position and the other pinions which are free become locked in turn.

Due to the construction employed, it will be seen that the motor rotates a definite amount each time one of the stops is released, regardless of whether or not the releasing of one of the stops is simultaneous with that of another, and even if all six stops are simultaneously released, the registration will be accurate and correct, i. e., six times as great as the registration caused by release of a single stop. This results from the fact that release of one pinion influences the operation of the remaining mechanism without regard to whether or not the remaining pinions are released.

The operation of the individual register 14 will be clear from the description of the structure previously given.

While the terms "energy" and "circuit" are employed in many of the appended claims, it will be understood that the invention in most of its aspects is equally applicable to the summation of registrations of gas or water consumption in several individual lines, and the claims are to be construed as embracing this equivalent use of the mechanism.

The invention in its broader aspects is not limited to the specific mechanisms shown and described but departures may be made therefrom within the scope of the accompanying claims without departing from the principles of the invention and without sacrificing its chief advantages.

What I claim is:—

1. A registering mechanism including in combination a register, a plurality of normally latched weights, each corresponding to a different circuit to be metered, a motor for moving said weights, means for selectively and independently releasing said weights and when released permitting them to move each time a predetermined quantity of energy is measured in the corresponding circuit and means interconnecting said motor and register for driving the register in accordance with movement of the weights.

2. A registering mechanism including in combination a plurality of weights rotatably mounted and normally held in predetermined positions of rotation, a motor for rotating said weights when they are released, means for releasing said weights allowing them to rotate, means for totalizing the movement of the weights and means for selectively and independently controlling the releasing means of the weights in accordance with energy measurements in different circuits.

3. A summation meter including in combination a register, a motor for driving the register and means for controlling the driving of the register comprising a plurality of gears, one connected to the motor and another of said gears being held against rotation, differential pinions interposed between said gears and forming a plurality of differential gearing weights associated with said pinions for initially moving said pinions, stops normally holding said pinions against revolution, and electromagnets for releasing said stops to permit driving of the register by the motor.

4. A meter including in combination a register, a motor for driving the register, differential gearing comprising a plurality of gears and interposed weighted pinions, one of said gears being connected to the motor and another being held against rotation, stops normally holding the pinions against rotation and electromagnetic means for selectively and individually withdrawing the stops to permit the corresponding weighted pinion to be initially moved by gravity and later by the motor through a predetermined amount of movement to actuate the register a corresponding amount.

HERMANN LANDOLT.